US012597415B2

(12) United States Patent
Singleton et al.

(10) Patent No.: US 12,597,415 B2
(45) Date of Patent: *Apr. 7, 2026

(54) VOICE RECOGNITION GRAMMAR SELECTION BASED ON CONTEXT

(71) Applicant: Google LLC, Mountain View, CA (US)

(72) Inventors: David P. Singleton, San Francisco, CA (US); Debajit Ghosh, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 18/065,588

(22) Filed: Dec. 13, 2022

(65) Prior Publication Data

US 2023/0112412 A1 Apr. 13, 2023

Related U.S. Application Data

(63) Continuation of application No. 16/539,054, filed on Aug. 13, 2019, now Pat. No. 11,538,459, which is a (Continued)

(51) Int. Cl.
*G10L 15/08* (2006.01)
*G01C 21/36* (2006.01)
(Continued)

(52) U.S. Cl.
CPC .......... *G10L 15/08* (2013.01); *G01C 21/3608* (2013.01); *G10L 15/19* (2013.01);
(Continued)

(58) Field of Classification Search
USPC ...... 704/8–10, 231, 246, 247, 251, 252, 257
See application file for complete search history.

(56) References Cited

U.S. PATENT DOCUMENTS

| 5,524,169 A | 6/1996 | Cohen et al. |
| 5,819,220 A | 10/1998 | Sarukkai et al. |

(Continued)

FOREIGN PATENT DOCUMENTS

| EP | 0661688 A2 | 7/1995 |
| JP | H10-141974 A | 5/1998 |

(Continued)

OTHER PUBLICATIONS

USPTO. Office Action relating to U.S. Appl. No. 16/539,054, dated Apr. 13, 2022.

(Continued)

*Primary Examiner* — Leonard Saint-Cyr
(74) *Attorney, Agent, or Firm* — Honigman LLP; Brett A. Krueger; Grant Griffith

(57) ABSTRACT

The subject matter of this specification can be embodied in, among other things, a method that includes receiving geographical information derived from a non-verbal user action associated with a first computing device. The non-verbal user action implies an interest of a user in a geographic location. The method also includes identifying a grammar associated with the geographic location using the derived geographical information and outputting a grammar indicator for use in selecting the identified grammar for voice recognition processing of vocal input from the user.

14 Claims, 5 Drawing Sheets

Related U.S. Application Data continuation of application No. 15/378,504, filed on Dec. 14, 2016, now Pat. No. 10,510,338, which is a continuation of application No. 13/958,049, filed on Aug. 2, 2013, now Pat. No. 9,858,921, which is a continuation of application No. 13/593,140, filed on Aug. 23, 2012, now Pat. No. 8,527,279, which is a continuation of application No. 12/044,310, filed on Mar. 7, 2008, now Pat. No. 8,255,224.

(51) Int. Cl.
| | |
|---|---|
| *G10L 15/19* | (2013.01) |
| *G10L 15/22* | (2006.01) |
| *G06F 16/2455* | (2019.01) |
| *G06F 16/248* | (2019.01) |
| *G06F 16/29* | (2019.01) |
| *G10L 15/065* | (2013.01) |

(52) U.S. Cl.
CPC .......... *G10L 15/22* (2013.01); *G06F 16/2455* (2019.01); *G06F 16/248* (2019.01); *G06F 16/29* (2019.01); *G10L 15/065* (2013.01); *G10L 2015/223* (2013.01); *G10L 2015/228* (2013.01)

(56) References Cited

U.S. PATENT DOCUMENTS

| | | | |
|---|---|---|---|
| 5,905,773 | A | 5/1999 | Wong |
| 6,112,174 | A | 8/2000 | Wakisaka et al. |
| 6,184,823 | B1 | 2/2001 | Smith et al. |
| 6,202,023 | B1 | 3/2001 | Hancock et al. |
| 6,487,495 | B1 | 11/2002 | Gale et al. |
| 6,745,165 | B2 | 6/2004 | Lewis et al. |
| 6,757,544 | B2 | 6/2004 | Rangarajan et al. |
| 6,813,342 | B1 | 11/2004 | Chu et al. |
| 6,937,986 | B2 | 8/2005 | Denenberg et al. |
| 6,999,930 | B1 | 2/2006 | Roberts et al. |
| 7,031,925 | B1 | 4/2006 | Goldberg |
| 7,257,570 | B2 | 8/2007 | Riise et al. |
| 7,328,155 | B2 | 2/2008 | Endo et al. |
| 7,376,640 | B1 | 5/2008 | Anderson et al. |
| 7,437,295 | B2 | 10/2008 | Pitts, III et al. |
| 7,577,244 | B2 | 8/2009 | Taschereau |
| 7,577,665 | B2 | 8/2009 | Ramer et al. |
| 7,606,715 | B1 | 10/2009 | Krenz |
| 7,616,964 | B2 | 11/2009 | Riise et al. |
| 7,630,900 | B1 | 12/2009 | Strom |
| 7,634,357 | B2 | 12/2009 | Schalk |
| 7,774,348 | B2 | 8/2010 | Delli Santi et al. |
| 7,788,252 | B2 | 8/2010 | Delli Santi et al. |
| 7,937,402 | B2 | 5/2011 | Feng et al. |
| 7,949,936 | B2 | 5/2011 | Friedman et al. |
| 8,060,367 | B2 | 11/2011 | Keaveney |
| 8,219,406 | B2 | 7/2012 | Yu et al. |
| 8,255,217 | B2 | 8/2012 | Stent et al. |
| 8,255,224 | B2 | 8/2012 | Singleton et al. |
| 8,898,095 | B2 | 11/2014 | Agrawal et al. |
| 2002/0111810 | A1 | 8/2002 | Khan et al. |
| 2002/0156570 | A1 | 10/2002 | Ohtsuji et al. |
| 2002/0173958 | A1 | 11/2002 | Asano et al. |
| 2003/0023440 | A1 | 1/2003 | Chu |
| 2003/0050075 | A1 | 3/2003 | Rangarajan et al. |
| 2003/0093419 | A1 | 5/2003 | Bangalore et al. |
| 2003/0125869 | A1 | 7/2003 | Adams, Jr. |
| 2003/0171926 | A1 | 9/2003 | Suresh et al. |
| 2003/0191639 | A1 | 10/2003 | Mazza |
| 2004/0076279 | A1 | 4/2004 | Taschereau |
| 2004/0243417 | A9 | 12/2004 | Pitts et al. |
| 2005/0055216 | A1 | 3/2005 | Bushey et al. |
| 2005/0080632 | A1 | 4/2005 | Endo et al. |
| 2006/0074660 | A1 | 4/2006 | Waters et al. |
| 2006/0129533 | A1 | 6/2006 | Purvis |
| 2007/0005570 | A1 | 1/2007 | Hurst-Hiller et al. |
| 2007/0005795 | A1 | 1/2007 | Gonzalez |
| 2007/0033005 | A1 | 2/2007 | Cristo et al. |
| 2007/0033055 | A1 | 2/2007 | Tanaka |
| 2007/0050191 | A1 | 3/2007 | Weider et al. |
| 2007/0061332 | A1 | 3/2007 | Ramer et al. |
| 2007/0100790 | A1 | 5/2007 | Cheyer et al. |
| 2007/0112739 | A1 | 5/2007 | Burns et al. |
| 2007/0118279 | A1 | 5/2007 | Kudo |
| 2007/0124134 | A1 | 5/2007 | Van Kommer |
| 2007/0255552 | A1 | 11/2007 | Thiesson et al. |
| 2007/0276651 | A1 | 11/2007 | Bliss et al. |
| 2007/0280445 | A1 | 12/2007 | Shkedi |
| 2008/0010259 | A1 | 1/2008 | Feng et al. |
| 2008/0057922 | A1* | 3/2008 | Kokes .................. G06F 16/634 455/566 |
| 2008/0086368 | A1 | 4/2008 | Bauman et al. |
| 2008/0091435 | A1 | 4/2008 | Strope et al. |
| 2008/0189110 | A1* | 8/2008 | Freeman ........... G06Q 30/0251 704/251 |
| 2008/0222119 | A1 | 9/2008 | Dai et al. |
| 2008/0228496 | A1 | 9/2008 | Yu et al. |
| 2008/0243611 | A1 | 10/2008 | Delli Santi et al. |
| 2008/0243777 | A1* | 10/2008 | Stewart ............... G06F 16/3344 |
| 2008/0243821 | A1 | 10/2008 | Delli Santi et al. |
| 2008/0270142 | A1* | 10/2008 | Srinivasan .............. G10L 15/26 704/270.1 |
| 2008/0312934 | A1 | 12/2008 | Cerra et al. |
| 2008/0319653 | A1 | 12/2008 | Moshfeghi |
| 2009/0006077 | A1 | 1/2009 | Keaveney |
| 2009/0015467 | A1 | 1/2009 | Kwon et al. |
| 2009/0037174 | A1 | 2/2009 | Seltzer et al. |
| 2009/0150156 | A1 | 6/2009 | Kennewick et al. |

FOREIGN PATENT DOCUMENTS

| | | |
|---|---|---|
| JP | 2002-318132 A | 10/2002 |
| JP | 2003-032388 A | 1/2003 |
| JP | 2006-146262 A | 6/2006 |
| JP | 2006-171305 A | 6/2006 |
| WO | 2005066934 A1 | 7/2005 |

OTHER PUBLICATIONS

"Exploiting Context Information in Spoken Dialogue Interaction with Mobile Devices", by Seneff et al., Proc. IMUX, Toronto, May 2007, 11 pages.

Authorized Officer, Simin Baharlou, International Preliminary Report for Application No. PCT/ JS2009/036369, mailed Sep. 16, 2010.

Extended European Search Report issued in European Application No. 09716241.6 on Apr. 9, 2015, 6 pages.

Michael Johnston, Srinivas Bangalore, Gunaranjan Vasireddy, Amanda Stent, Patrick Ehlen, Marilyn Walker, Steve Whittaker, and Preetam Maloor. (2002) MATCH: an architecture for multimodal dialogue systems. In Proceedings of the 40th Annual Meeting on Association for Computational Linguistics (ACL '02). Association for Computational Linguistics.

Notice of Allowance issued in Korean Application No. 10-2017-7018264, mailed on Jun. 14, 2018, 4 pages (with English Translation).

Office Action in Chinese Application No. 200980115721.4, dated Jul. 30, 2012, 10 pages.

Office Action in Japanese Application No. 2010-549918, dated Feb. 19, 2013, 5 pages.

Office Action issued in European Application No. 09716241.6, mailed on Feb. 21, 2018, 5 pages.

Office Action issued in Korean Application No. 10-2015-7021616, mailed on Sep. 29, 2017, 7 pages (English translation).

Office Action issued in Korean Application No. 10-2017-7018264, mailed on Mar. 21, 2018, 6 pages (with English Translation).

Office Action issued in Korean Application No. 10-2018-7011064, mailed on Jul. 17, 2018, 10 pages (with English translation).

Office Action issued in Korean Application No. 10-2018-7011064, mailed on Jan. 29, 2019, 6 pages (with English translation).

(56) References Cited

OTHER PUBLICATIONS

PCT International Searching Authority, International Search Report & Written Opinion for Application No. PCT/US09/36369, dated Apr. 21, 2009, 8 pages.

* cited by examiner

VOICE RECOGNITION GRAMMAR SELECTION BASED ON CONTEXT

CROSS-REFERENCE TO RELATED APPLICATIONS

This patent application is a continuation of, and claims priority under 35 U.S.C. § 120 from, U.S. patent application Ser. No. 16/539,054, filed on Aug. 13, 2019, which is a continuation of U.S. patent application Ser. No. 15/378,504, filed on Dec. 14, 2016, which is a continuation of U.S. patent application Ser. No. 13/958,049, filed on Aug. 2, 2013, which is a continuation of U.S. patent application Ser. No. 13/593,140, filed on Aug. 23, 2012, which is a continuation of U.S. patent application Ser. No. 12/044,310, filed on Mar. 7, 2008. The disclosures of these prior applications are considered part of the disclosure of this application and are hereby incorporated by reference in their entireties.

TECHNICAL FIELD

This instant specification relates to voice recognition.

BACKGROUND

Multimodal applications can accept multiple types, or modes, of input. For example, a multimodal application can accept input from users such as typed commands and mouse clicks; however the multimodal application also can accept other forms of input such as voice input. Voice recognition systems can interpret the voice input using a grammar that includes a particular vocabulary.

Some multimodal applications implement a form-filling model where different input fields in an application are associated with different grammars. For example, the multimodal application can associate a "name" grammar that includes a vocabulary of names with a "name" field that accepts a person's name. When a person selects the "name" field with his or her mouse, the multimodal application can select the "name" grammar associated with the field.

SUMMARY

In general, this document describes selecting a grammar for use in voice recognition, where the grammar is selected based on implicit context information based on one or more user actions.

In a first general aspect, a computer-implemented method is described. The method includes receiving geographical information derived from a non-verbal user action associated with a first computing device. The non-verbal user action implies an interest of a user in a geographic location. The method also includes identifying a grammar associated with the geographic location using the derived geographical information and outputting a grammar indicator for use in selecting the identified grammar for voice recognition processing of vocal input from the user.

In a second general aspect, a computer-implemented method is described that includes receiving context information based on a user action associated with a computing device, where the user action is unprompted by a voice recognition processor. The method includes deriving a geographical location based on the context information, identifying a grammar associated with the geographical location, and outputting a grammar identifier for use in selecting the grammar to use in processing vocal input from the user.

In yet another general aspect, a system is described. The system includes an interface to receive context information based on a non-verbal user action associated with a first computing device. The non-verbal user action implies an interest of a user in a geography. The system also includes a means for identifying a grammar associated with a geographical location derived from the received context information and a voice recognition server configured to use the identified grammar to interpret vocal input received from the user.

The systems and techniques described here may provide one or more of the following advantages. First, a system can increase the speed at which vocal input is recognized by identifying an appropriate subset of grammars instead of using a larger general grammar. Additionally, selecting a subset of grammars may increase the accuracy of voice recognition for vocal commands given within a particular context associated with the subset. The system also can reduce the amount of user interaction in voice recognition processes. Furthermore, additional or new grammars can be selected in a way that is transparent to a user (e.g., based on user interaction with a software application instead of based on explicit user answers to prompts by a voice recognition system).

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for selecting a grammar to use in speech recognition. More specifically, an application can generate context information based on how a user interacts with a device running the application. The device can transmit the context information to a voice recognition system. The voice recognition system can identify a particular grammar that is associated with the context information and can subsequently use the identified grammar in audio recognition of vocal input received from the device (e.g., voice commands from a user of the device).

In some implementations, context information includes geographical information. If a user views a map using a mobile browser on a cell phone, the cell phone can transmit information about a geographical location displayed by the map to a voice recognition system. The voice recognition system can identify the geographic location based on the received information and can select a grammar that includes a vocabulary of words, syntax, etc. associated with the geographic location. The voice recognition system can interpret subsequently received vocal input from the cell phone using the selected grammar.

A user can opt in to permit devices associated with the user (e.g., through a unique identifier—such as a cookie— assigned to the user) to share context information with the voice recognition system. If a user opts out of sharing context information, the voice recognition system can use a default grammar or explicitly prompt a user for geographic or other context information for use in selecting a particular grammar to use in voice recognition processing.

Figure 1:
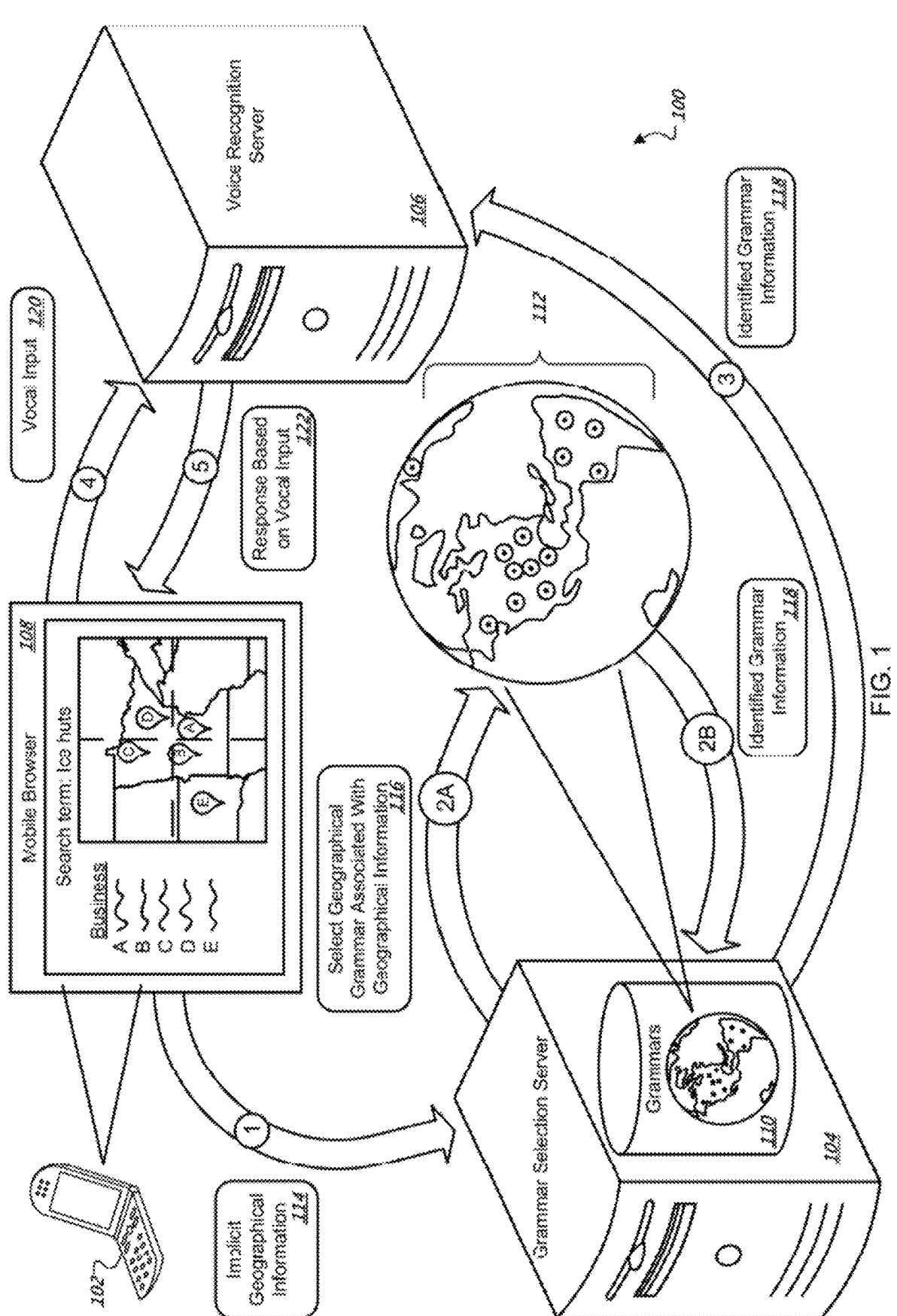
FIG. 1 is a diagram of an exemplary system for selecting a grammar used in computer-implemented voice recognition.

FIG. 1 is a diagram of an exemplary system 100 for selecting a grammar used in computer-implemented voice recognition. In some implementations, the exemplary system 100 selects the grammar based on implicit context information that is generated as a result of user actions. The system 100 includes a client device 102, a grammar selection server 104, and a voice recognition server 106.

In the implementation of FIG. 1, the client 102 transmits context information to the grammar selection server 104, which uses the context information to select a grammar. A grammar selection server sends information about the selected grammar to the voice recognition server 106, which uses the selected grammar to interpret audio input received from the client 102.

For example, the client 102 may be a cell phone that is running a mobile browser 108. A user can enter a search into the mobile browser to identify businesses that sell "ice huts." The browser can display a map that shows related businesses in Canada, North and South Dakota, and Minnesota. The user may have previously entered a location identifier, such as a zip code, that is used by the browser to identify a location to show on the map. The user can enter the location identifier in a previous session and the browser may store the identifier for use in subsequent sessions (e.g., the location identifier can be stored as a cookie on the client).

In other implementations, the cell phone runs a dedicated application 108 instead of the mobile browser 108. For example, the dedicated application 108 may not enable browsing of web pages, but can be configured to interface with a particular remote application, such as an online mapping application.

The mobile browser or another application running on the cell phone 102 can transmit implicit geographical information 114 to the grammar selection server as indicated by an arrow labeled "1." In some implementations, the context information includes implicit geographical information 114 that is based on the map displayed by the mobile browser 108. For example, implicit geographical information 114 can include coordinates that identify a center of the displayed map. In this example, the center of the map coincides with a location in the middle of Minnesota.

A grammar selection server 104 can select 116 a grammar based on the received context information. In some implementations, if the context information includes geographical information 114, a grammar selection server can access a data store 110 that identifies grammars 112 associated with geographical locations. Particular grammars can be associated with particular geographic locations.

Each of the grammars 112 can include vocabulary that corresponds to vocabulary associated with the corresponding geographical location. For example a grammar associated with Minneapolis, Minnesota can include words or phrases that describe businesses, points of interest, events, news, etc. that are located or occur in association with Minneapolis.

In FIG. 1, the implicit geographical information 114 includes coordinates for a location positioned in the middle of Minnesota. The grammar selection server identifies a grammar that is anchored, or has a center, at a location that is closest to the middle of Minnesota. The grammar selection server can generate information 118 that identifies the grammar as indicated by arrows labeled "2A" and "2B."

Next, in some implementations, the grammar selection server 104 transmits the identified grammar information 118 to the voice recognition server 106 as indicated by an arrow labeled "3."

The user can speak into the cell phone 102, which transmits vocal input 120 to the voice recognition server 106 as indicated by an arrow "4." The voice recognition server 106 can interpret the vocal input 120 using the grammar that was identified by the grammar selection server 104.

The recognition server 106 can perform one or more actions based on the vocal input. In some implementations, the voice recognition server 106 can transmit a response based on the vocal input back to the cell phone 102 as indicated by an arrow labeled "5." For example, a user of the cell phone 12 can audibly request a new search for "Paul Bunyan." The cell phone 102 can transmit the vocal search request to the voice recognition server 106. Because the map that the user is currently viewing (or has previously viewed) on the mobile browser 108 is centered on Minnesota, the voice recognition server 106 uses a grammar that is anchored, or centered, at a location near the center of Minnesota. The voice recognition server 106 uses this grammar to search sounds, words, phrases that correspond to the vocal input "Paul Bunyan." In some implementations, a grammar anchored near or within Minnesota may include information used to interpret the name "Paul Bunyan" because this term is more frequently associated with information associated with Minnesota relative to other parts of the world.

The voice recognition server 106 can transmit text "Paul Bunyan," which corresponds to the vocal input from the cell phone 102. The cell phone 102 can display the received text on the mobile browser 108. If a user approves the translation performed by the voice recognition server 106, the browser can initiate a new search by submitting the text "Paul Bunyan" as a search term to a search engine. In other implementations, the voice recognition server 106 can initiate the search using the term "Paul Bunyan" without approval or from the user of the cell phone 102. The voice recognition server 106 can transmit the results from the search to the cell phone 102 without previously transmitting text recognized from the vocal input.

The labeled arrows of FIG. 1 indicate an exemplary sequence of events that occur in the system 100. However, the occurrence of events is not limited to the sequence shown. For example, one or more steps in the sequence can occur in parallel.

Figure 2:
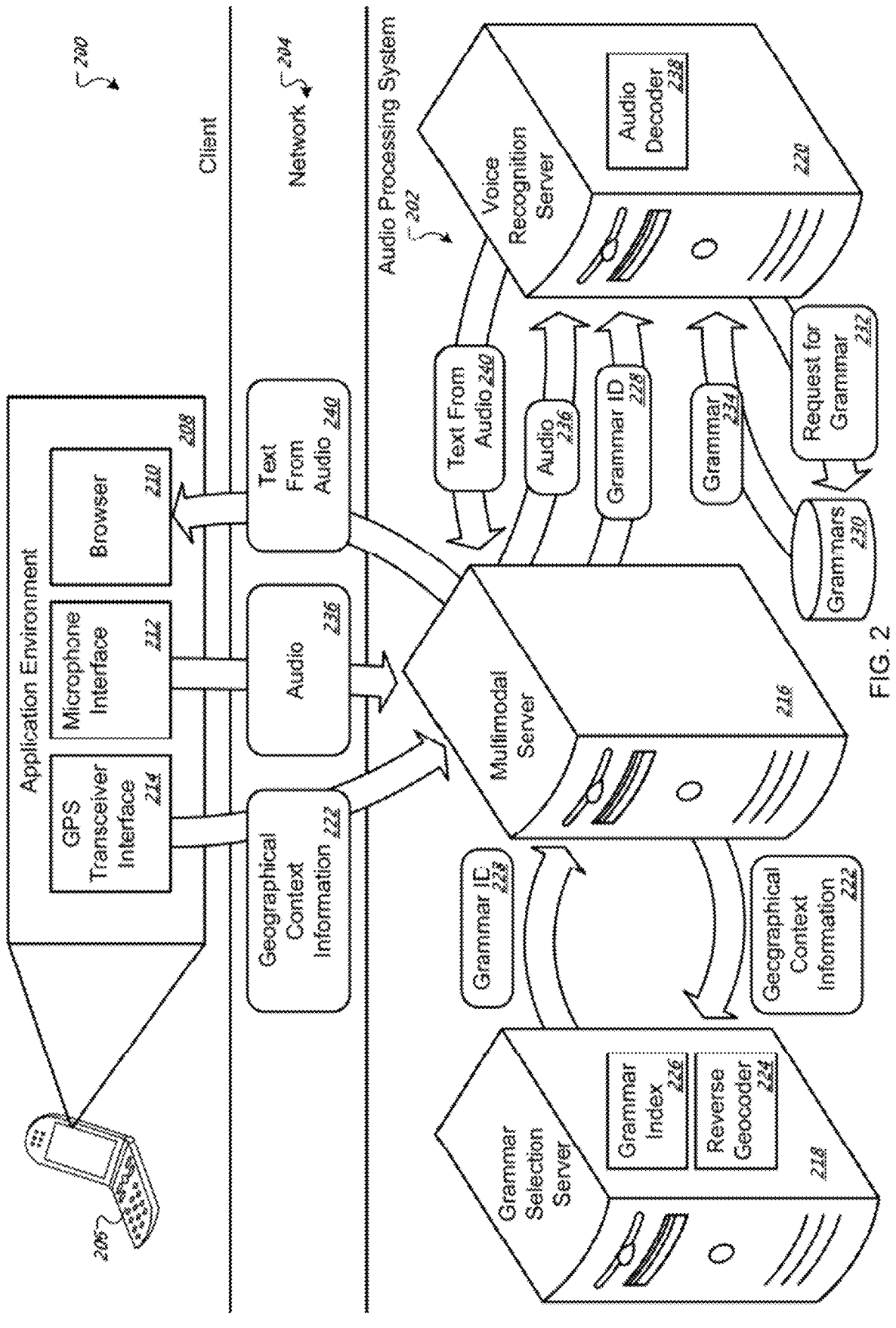
FIG. 2 is a diagram of an exemplary client and an exemplary audio processing system used in a selection of a grammar for voice recognition.

FIG. 2 is a diagram of an exemplary client 200 and an exemplary audio processing system 202 used in a selection of a grammar for voice recognition. The client 200 and the audio processing system 202 can communicate using a network 204 that can include, in some implementations, the Internet and a cellular network. The client 200 can include a cell phone or other mobile device 206 that, in turn, includes an application environment 208. The application environment 208 can include an Internet browser 210, a microphone interface 212, and a GPS transceiver interface 214. The audio processing system 202 can include a multimodal server 216 that servers an interface for the audio processing system 202 with the client 200, a grammar selection server 218, and a voice recognition server 220.

An application within the application environment 208 can generate or identifying geographical contact information 222 and transmit the information to the multimodal server 216. For example, the GPS transceiver interface 214 can receive GPS coordinates from a GPS transceiver based on a location of the cell phone 206. The GPS transceiver interface 214 can transmit the GPS coordinate information to the multimodal server 216.

In some implementations, the GPS coordinate information can be appended as part of a uniform resource identifier (URI) that is included in a hypertext transport protocol (HTTP) POST command submitted by the browser 210 to the multimodal server 216. In other implementations that use an application other than a browser, the application can generate an HTTP GET command, where a URI in the command includes the GPS coordinate information (or other context information). In another implementation, the GPS coordinate or other context information is not appended in the URI, but instead is included as binary information in the body of an HTTP request (e.g., GET or POST)

In another example, the browser 210 can transmit geographical context information about items displayed by the browser 210. For example, if a user views a web page that includes multiple mentions of the Bermuda Islands, the browser 210 can transmit geographical context information that specifies the Bermuda Islands.

The multimodal server 216 can receive the geographical context information 222 and can forward the information to the grammar selection server 218. A grammar selection server 218 can include a reverse geocoder 224, which uses the geographical context information 222 to identify a location. For example, if the geographical context information 222 includes GPS coordinates, the reverse geocoder 224 can determine a location that corresponds to the GPS coordinates using stored mappings between coordinates and geographical locations.

In some implementations, the grammar selection server includes a grammar index 226 that associates particular locations with particular grammars. For example, the grammar index 226 associates the location "Bermuda Islands" with a Bermuda grammar that includes vocabulary, syntax, etc. that is associated with that location.

The grammar selection server 218 selects a grammar using the grammar index 226 by identifying a grammar that is associated with a location identified by the reverse geocoder 224. The grammar index can identify each of the grammars in using a grammar ID.

The grammar selection server 218 can transmit a selected grammar ID 228 to the multimodal server 216, which in turn can forward the grammar ID 228 to the voice recognition system. In other implementations not shown in FIG. 2, the reverse geocoder 224 can identify and return the grammar that is associated with a location nearest the identified location and then transmits a selected grammar ID 228 for that grammar to the multimodal server 216.

The voice recognition system can use the grammar ID to load identified grammar for use in subsequent audio processing. For example, the voice recognition server can transmits a request 232 to a data store 230 for a grammar, where the request 232 includes the grammar ID 228. The data store can return a grammar 234 that is specified by the grammar ID 232.

The voice recognition server can use the grammar 234 to interpret audio that is received subsequently from the cell phone 206. For example, the user can speak a search term, which is received by a microphone within the cell phone 206. The microphone interface 212 can transmit audio 236 from the microphone to the multimodal server 216.

The multimodal server 216 can transmit the audio 236 to the voice recognition server 220, which uses an audio decoder 238 to interpret the audio 236. For example, the audio decoder 238 can load the grammar 234 to process the audio 236 into a textual representation. The voice recognition server 220 can use the textual representation to, for example, initiate a search with a search engine (not shown). In another example, the interpreted audio can be transmitted as text 240 the multimodal server 216. The multimodal server 216 can transmit the text 240 back to the cell phone 206. The cell phone 106 can display the text using the browser 210 or another application in the application environment 208.

In some implementations, the client 200 submits new geographical context information based on new user interactions. For example, if the user changes location, the GPS transceiver within the cell phone 206 can transmit new GPS coordinates to the multimodal server 216. In another example, the user may view a map that is associated with a different location. The browser 210 can transmit the new map location to the multimodal server 216. The audio processing system can select a new grammar based on the new geographic context information and interpret received audio based on the new grammar.

Although the multimodal server 216, the grammar selection server 218, and the voice recognition server 220 are illustrated as separate devices, the servers can be combined into a single device or a single server can be implemented using multiple devices.

Figure 3:
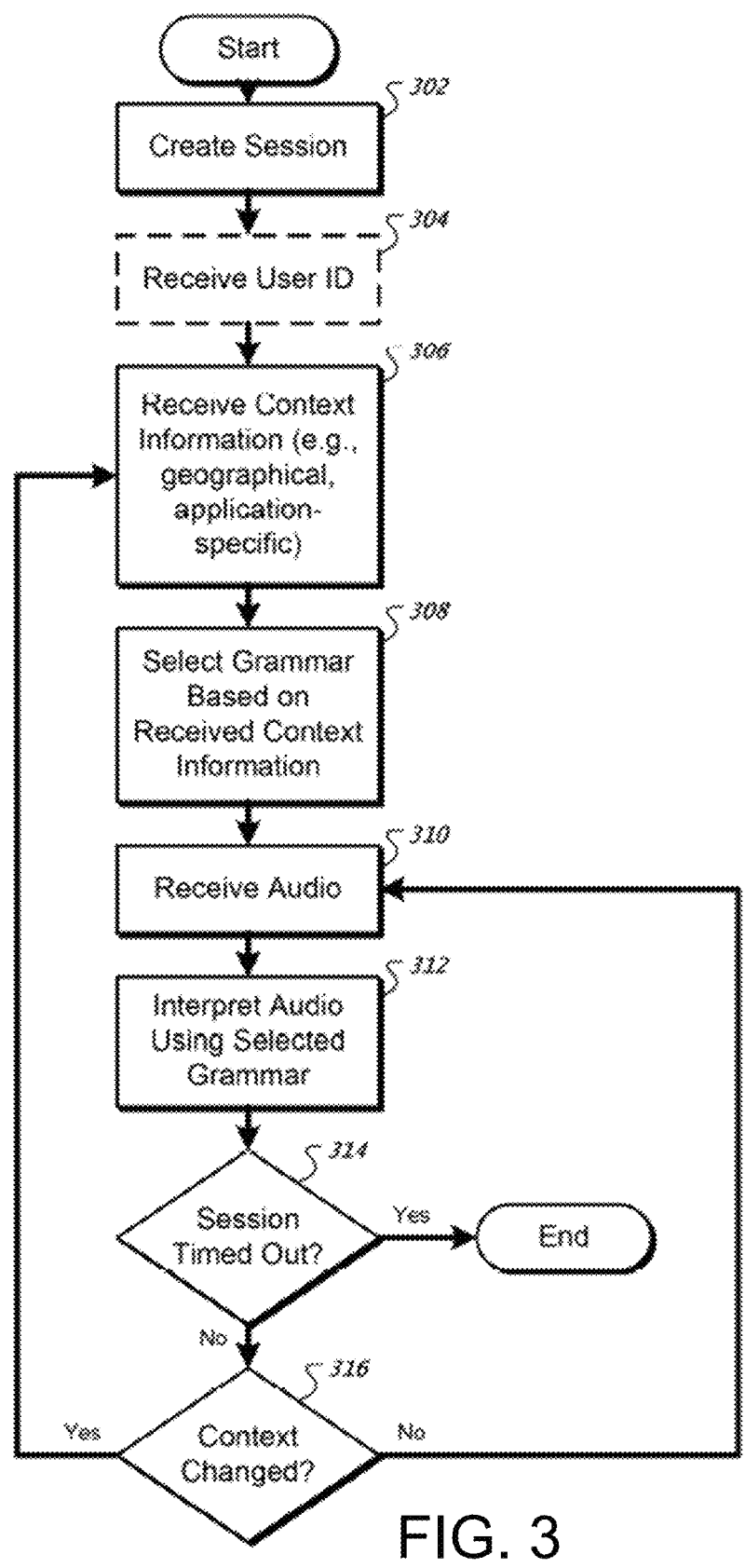
FIG. 3 is a flow chart of an exemplary method for selecting a grammar based on context information.

FIG. 3 is a flow chart of an exemplary method 300 for selecting a grammar based on context information. The systems 200 and 202 are used in an example implementation of method 300. However, other systems, including the system 100, can implement the method 300.

In step 302, a session is created between the client 200 and the audio processing system 202. For example, the cell phone 206 can establish a communication session (e.g., based on HTTP protocols) with the multimodal server 216. The session can be established, for example, when a browser access a web interface for a search engine (e.g., a search web page, an interactive map, a social networking site that permits users to search for profiles hosted on the site, etc.). In another implementation, the session is established, when a particular application is started on the cell phone 206. For example, a session may be initiated when a dedicated map program is started on the cell phone 206.

In optional step 304, a user ID is received. For example, the cell phone 206 may include a mobile browser that stores cookies within a memory of the cell phone. The cookies can include an identifier that identifies a user of the cell phone. The audio processing system 202 may have previously transmitted the user ID to the browser in response to an earlier interaction of the mobile browser with the audio processing system 202 or another server that the audio processing system 202 can access. For example, the user may visit a web page that includes an interface for a search engine. The search engine can issue a unique identifier to the user. The audio processing system 202 can access a list of identifiers that are stored by the search engine.

In step 306, context information is received. For example, the multimodal server 216 receives geographical context information such as GPS coordinates that specify a current location of the mobile device 206.

In some implementations, the multimodal server 216 can receive other context information such as application-specific context information. The client 202 can transmit information that specifies which application is accessed by a user. For example, the information can specify that the user is interacting with a browser application. Furthermore, the information can include a history of past navigation or other actions previously performed by a user of the application. For example, the context information can specify that a user has requested a map by specifying a zip code, zoomed out on the given map, navigated west on the map approximately 200 miles, requested a satellite view of the map, requested that points of interest be displayed on the map, etc.

In another implementation, the multimodal server 216 can receive context information about items that are displayed by an application running on the client 200, which may be a desktop computer. For example, the user can view a portal web page that includes several types of content such as financial news content, entertainment news content, technology news content, etc. If the user's cursor hovers over the financial news content, the computing device can extract information from a region surrounding the cursor (e.g., text within a radius of the center of the cursor can be extracted). Some or all of the extracted information can be included in the context information transmitted to the multimodal server.

In step 308, a grammar is selected based on the received context information. For example, the grammar selection server 218 can select a grammar that includes a financial vocabulary in the received context information indicates that the user's mouse is hovering over content describing financial information on a web page. More specifically, a classification module (not shown) within the grammar selection server 218 can classify the extracted content. The grammar selection server 218 can match one or more keywords resulting from the classification of the extracted content with keywords that are associated with grammars by the grammar index 226.

In another example, the grammar selection server 218 can select a grammar associated with a particular geography, where the particular geography corresponds to the GPS coordinates, which indicate a current location of the cell phone 206.

In yet another example, the grammar selection server 218 can select a grammar including an application-specific vocabulary if the received context information specifies that the user is interacting with a particular application. For example, if the user is interacting with a calendar application (e.g., resident on the client 200 or hosted and accessed via the browser 210), the grammar selection server 218 can select a grammar that includes a calendar-specific vocabulary and calendar-specific grammar rules.

The grammar selection server 218 can also use the received user ID to select a grammar. In some implementations, a grammar may be constructed based on a user's past Web search history. For example, if a user frequently performed past web search queries associated with archaeology, a grammar builder (not shown) can construct a personalized grammar for the user that includes vocabulary, syntax, etc. associated with archaeology.

In some implementations, more than one grammar can be selected using one or more types of context information. For example, context information derived from items viewed by a user may correlate to two more grammars. In this case, the grammar selection server can select multiple grammars for use in the voice recognition.

In step 310, audio can be received. For example, the user of the device 206 can speak into a microphone of the device 206. The microphone interface 212 can transmits the speech captured by the microphone to the voice recognition server 220.

In step 312, the received audio can be interpreted using the previously selected grammar. For example, the voice recognition server 220 can access a data structure that stores grammars to select a grammar that the grammar selection server 218 identified. The audio decoder 238 can use the selected grammar to interpret the received audio.

In step 314, it is determined whether the session has timed out. For example, the session established between the client 200 and the audio processing system 220 in step 302 can have a time limit. If the time limit is exceeded, the method 300 can end. In another implementation, if the session times out, the audio processing system 202 prompts the client 200 to establish a new session. In some implementations, limiting the session time may prevent a client from monopolizing the audio processing system, especially if the client is inactive for a long period.

In step 316, it is determined whether a context has changed. For example, a user may change locations. If the user moves to a new location, a GPS transceiver can update GPS coordinates in response to reflect the new location. The new context information can be received and processed as previously described in association with step 306 and subsequent steps. In another example, the user may access a different application, or view different at a data using the same application. The change in application or use of an application can initiate transmission of the new context information.

If the context information does not change, then the method 300 can repeat steps starting with step 310. For example, the audio processing system 202 can continue to use the previously selected grammar to interpret any received audio.

Figure 4:
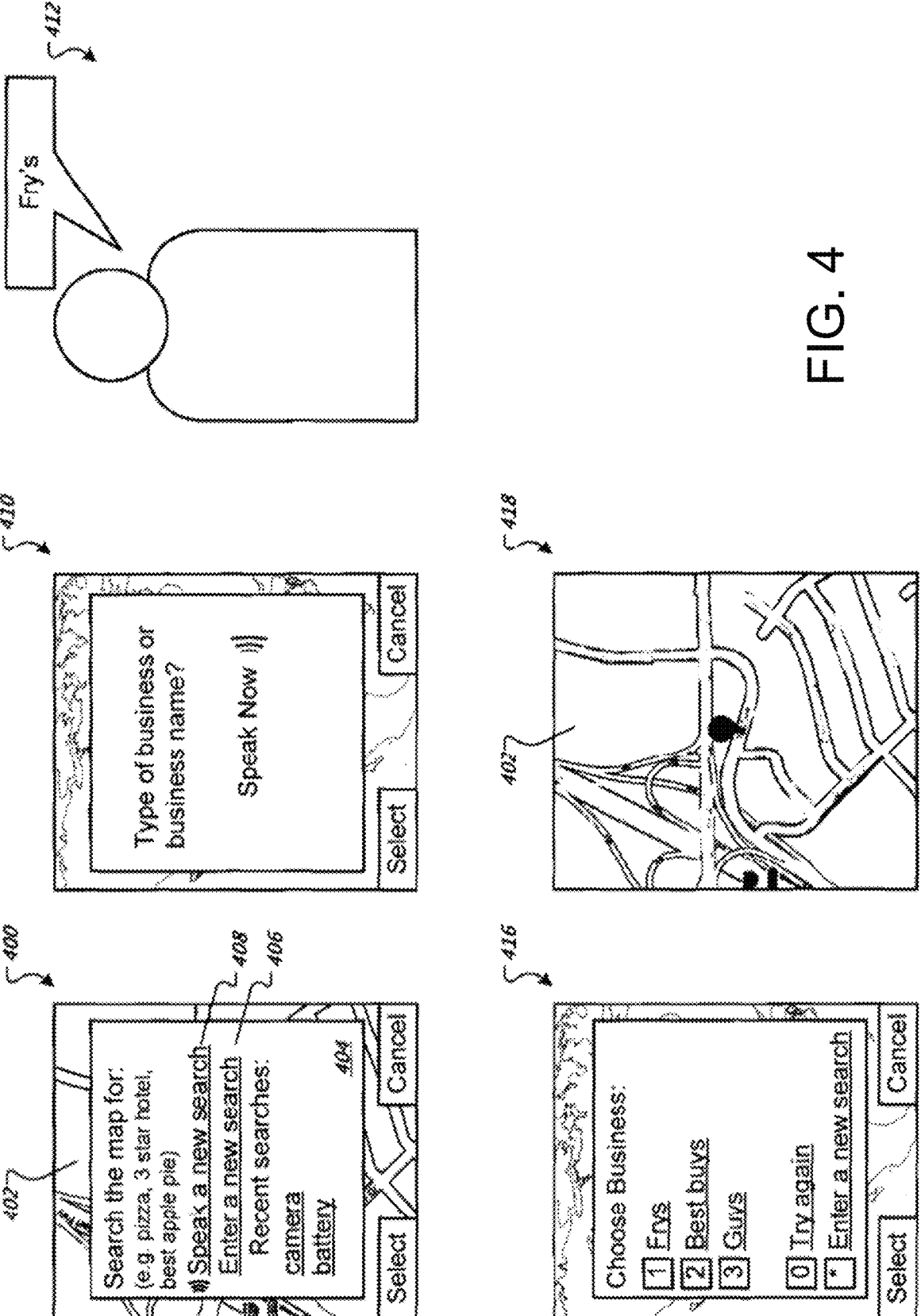
FIG. 4 shows exemplary screenshots of a user interface for a client that interacts with an audio processing system.

FIG. 4 shows exemplary screenshots of a user interface for a client that interacts with an audio processing system that selects a grammar based on context information. The screenshot 400 includes a map 402. A user can launch a browser for the client and log onto an online interactive map service such as GOOGLE Maps or YAHOO! Maps. The user can specify a location to map by entering a zip code, area code, city and state, or other location identifier. For example, the user can enter the zip code 95661. The map service can then transmit a corresponding map of Roseville, CA for display on the browser.

The browser (or web page displayed by the browser) can present a search option window 404. A user can interact with the search option window 404 to initiate a search for businesses, points of interests, locations, etc., and can display the results on the map 402. The search option window 404 can accept "entered" searches as indicated by the option 406. For example, a user can select the option 406 using a keypad. Alternatively, the user can speak the selection "Enter a new search." The user can then enter a search via the keypad.

The search option window can also accept spoken searches as indicated by the option 408. For example, a user can selection the option 408 using the keypad or by speaking the selection.

The screenshot 410 shows an exemplary interface displayed after a user has selected the option 408 indicating the user desires to speak a new search. In this example, the client visually prompts the user to speak a type of business or business name. The diagram 412 illustrates a user speaking a search term "Fry's."

In other implementations, the client can prompt a user to speak other terms such as points of interest, geographical locations, etc.

In yet other implementations, the user is not visually prompted to speak a search, but can initiate a search sua sponte. For example, a browser may display a web page that displays technology news. The user could say, "Search for AJAX." In yet other implementations, the client may audibly prompt a user to enter or speak a search or other vocal input.

In another implementation, the user can press a key on the device—such as an "answer call" key on a cell phone—to indicate that the user would like to initiate a voice search. The user can hold the key when speaking or initiate the search by holding the key for a predetermined length of time. In the latter implementation, the voice search can terminate after a predetermined amount of time has passed where a voice signal was not detected.

Although not indicated in the previous screenshots, the client can transmit geographical information about the map 402 displayed by the client. An audio processing system can select a grammar that is associated with the geographical information for use in interpreting audio received in response to the prompt displayed in screenshot 410.

Screenshot 416 shows interpreted audio based on the spoken search term "Fry's." A user can select one of the possible interpretations using the keypad or by saying, for example, a number associated with each of the interpretations. Screenshot 418 shows the map 402 of Roseville, CA with a pushpin icon 420 identifying a location of a Fry's Electronics store.

Figure 5:
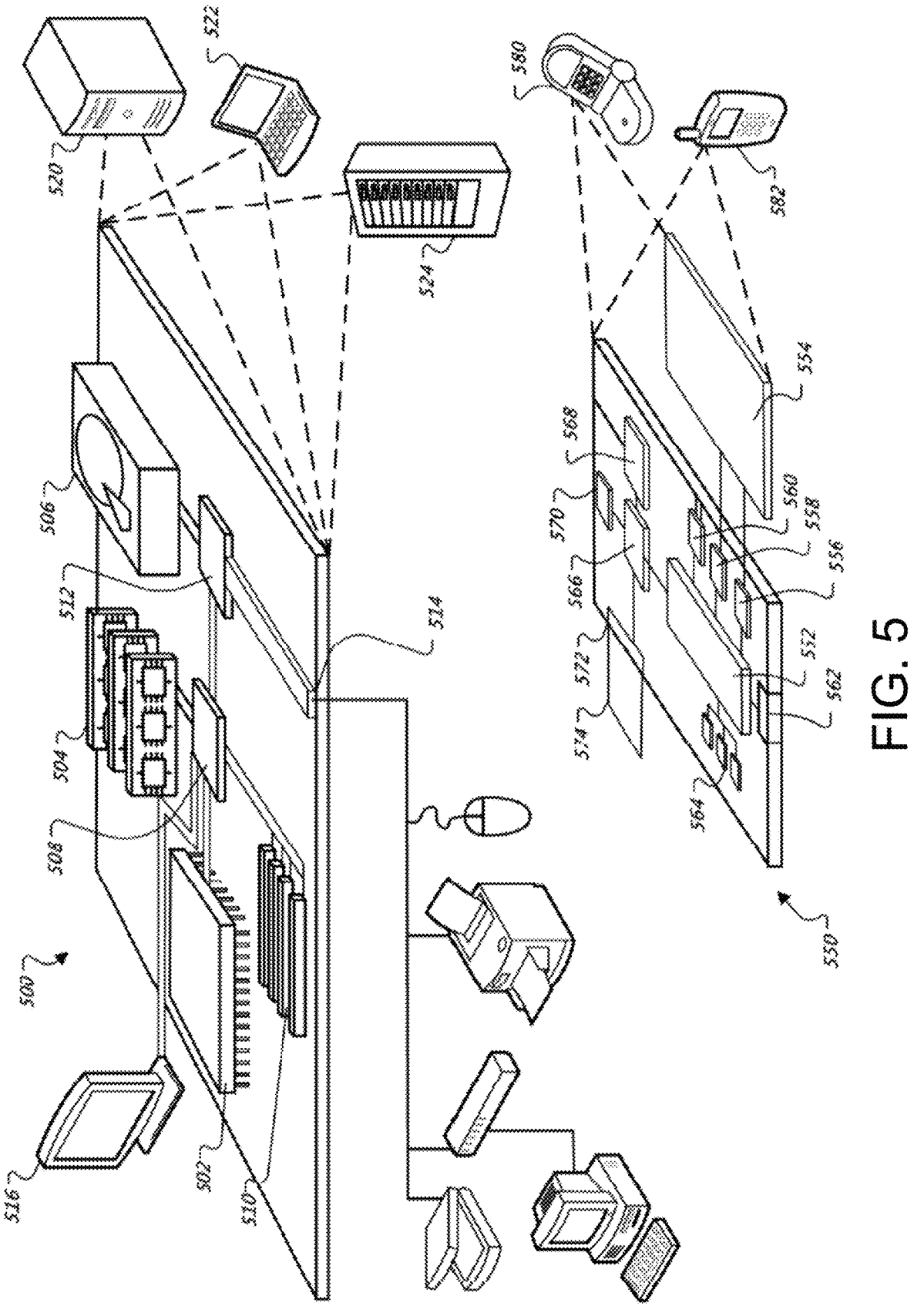
FIG. 5 is a block diagram of computing devices that may be used to implement the described systems and methods.

FIG. 5 is a block diagram of computing devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high-speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, geographic information used to select a geographic location can be derived based on text viewed by a user. For example, a user can visit a web site that describes the great state of Oklahoma. A web browser (or other application) can transmit geographic information indicating that the user is interested in Oklahoma. In some implementations, the web browser (or other application) only transmits the geographic information if a threshold number of words related to Oklahoma occur.

In another implementation, geographic information used to select a geographic location is based on text entered by the user. For example, the user may enter search terms such as "wild fires" and "California" into a search engine interface. The grammar selector can also correlate these to terms to identify a particular location within California. For instance, recent search results from an aggregated group of search engine users may indicate that the results often include mentions of San Diego, California. The grammar selector can identify a grammar anchored near San Diego based on recent search results.

Additionally, although locating a current position of a device has been described in reference to GPS capabilities within a cell phone or other portable device, other location-based detection system can be used. For example, the position of a mobile device can also be ascertained via cell of origin (COO) mobile positioning techniques, time difference of arrival (TDOA) signal detection techniques, time of arrival (TOA) techniques, angle of arrival (AoA) measurement techniques, enhanced observed time difference (EOTD) techniques, etc.

In other implementations, a grammar builder can compile a personalized grammar for a user based on emails sent or received by the user. The grammar selection server can select a personalized grammar to use based on a user ID received from the client.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method executed on data processing hardware that causes the data processing hardware to perform operations comprising:

receiving audio data corresponding to an utterance of one or more search terms spoken by a user of a user device;

determining a context of the user device;

based on the audio data corresponding to the utterance of the one or more search terms and the context of the user device, displaying a list of search results on a display in communication with the data processing hardware;

receiving additional audio data corresponding to an additional utterance spoken by the user indicating selection of a search result in the list of search results displayed on the display; and displaying, on the display, a map that includes a visual indicator of a geographic location associated with the selected search result.

2. The computer-implemented method of claim 1, wherein:

determining the context of the user device comprises determining a location of the user device; and displaying the list of search results on the display is based on the audio data corresponding to the utterance of the one or more search terms and the location of the user device.

3. The computer-implemented method of claim 2, wherein the search results in the list of search results displayed on the display comprise names of businesses in a vicinity of the user device.

4. The computer-implemented method of claim 1, wherein:

each search result in the list of search results displayed on the display is assigned a corresponding number graphically displayed adjacent to the search result on the display; and the additional utterance spoken by the user comprises the corresponding number assigned to the search result the user is selecting.

5. The computer-implemented method of claim 1, wherein:

displaying the list of search results on the display comprises displaying the list of search results in a graphical user interface of a browser application displayed on the display; and providing the map that includes the visual indicator of the geographic location comprises displaying the map in the graphical user interface of the browser application displayed on the display.

6. The computer-implemented method of claim 1, wherein the operations further comprise:

receiving user selection of a key indicating user selection to initiate a voice search, wherein receiving the audio data of the utterance of the one or more search terms is based on receiving the user selection of the key.

7. The computer-implemented method of claim 1, wherein the user device captures the utterance of the one or more search terms spoken by the user via a microphone.

8. A system comprising:

data processing hardware; and memory hardware in communication with the data processing hardware and storing instructions that when executed by the data processing hardware cause the data processing hardware to perform operations comprising:

receiving audio data corresponding to an utterance of one or more search terms spoken by a user of a user device;

determining a context of the user device;

based on the audio data corresponding to the utterance of the one or more search terms and the context of the user device, displaying a list of search results on a display in communication with the data processing hardware;

receiving additional audio data corresponding to an additional utterance spoken by the user indicating selection of a search result in the list of search results displayed on the display; and displaying, on the display, a map that includes a visual indicator of a geographic location associated with the selected search result.

9. The system of claim 8, wherein:

determining the context of the user device comprises determining a location of the user device; and displaying the list of search results on the display is based on the audio data corresponding to the utterance of the one or more search terms and the location of the user device.

10. The system of claim 9, wherein the search results in the list of search results displayed on the display comprise names of businesses in a vicinity of the user device.

11. The system of claim 8, wherein:

each search result in the list of search results displayed on the display is assigned a corresponding number graphically displayed adjacent to the search result on the display; and the additional utterance spoken by the user comprises the corresponding number assigned to the search result the user is selecting.

12. The system of claim 8, wherein:

displaying the list of search results on the display comprises displaying the list of search results in a graphical user interface of a browser application displayed on the display; and providing the map that includes the visual indicator of the geographic location comprises displaying the map in the graphical user interface of the browser application displayed on the display.

13. The system of claim 8, wherein the operations further comprise:

receiving user selection of a key indicating user selection to initiate a voice search, wherein receiving the audio data of the utterance of the one or more search terms is based on receiving the user selection of the key.

14. The system of claim 8, wherein the user device captures the utterance of the one or more search terms spoken by the user via a microphone.

* * * * *